United States Patent [19]

Hines

[11] Patent Number: 4,613,851
[45] Date of Patent: Sep. 23, 1986

[54] REMOTE PRESSURE-INDICATING MEANS

[75] Inventor: James H. Hines, Vernon, N.J.

[73] Assignee: Tap-Rite Products Corp., Hackensack, N.J.

[21] Appl. No.: 664,007

[22] Filed: Oct. 23, 1984

[51] Int. Cl.⁴ ............................................ G08B 21/00
[52] U.S. Cl. .................................. 340/688; 340/614; 340/626
[58] Field of Search ...................... 340/688, 626, 614; 73/732, 709, 714, 733; 200/81.8

[56] References Cited

U.S. PATENT DOCUMENTS

| 4,275,393 | 6/1981 | Johnston | 340/626 |
| 4,536,756 | 8/1985 | DePasquale et al. | 340/688 |

FOREIGN PATENT DOCUMENTS 2470374  5/1981  France ................................ 73/714

Primary Examiner—James L. Rowland
Assistant Examiner—Anne Marie F. Capati
Attorney, Agent, or Firm—Wolder, Gross & Yavner

[57] ABSTRACT

At least two magnetic-reed switches are mounted at spaced angular locations beneath the scale of a Bourdon-type pressure gage wherein the needle tip carries a permanent magnet. The reed switches change their respective states upon sensed-pressure descent to first and second predetermined levels of pressure, respectively indicative of different impending needs to switch a new container into the line of pressure delivery to beverage-dispensing apparatus. In one form, the impending needs reflect corresponding situations of remaining gas content of the cylinder, for room temperature storage and for cold-room storage, respectively; and a manual switch at the gage enables the gage to perform, as is appropriate for the particular situation of stored-container temperature. In another form, the second or additional magnetic-reed switch is positioned beneath the scale for operation upon a sensed low level of gas-pressure effectiveness for beverage dispensing. In all cases, wiring connections to the switches of the gage operate indicator-lamp/alarm functions at a remote monitoring-unit location, whereby management personnel may take responsible action.

10 Claims, 3 Drawing Figures

REMOTE PRESSURE-INDICATING MEANS

BACKGROUND OF THE INVENTION

The invention relates to pressure-responsive means adapted for remote indication of pressure, as in the remote monitoring of the pressure level in a carbon-dioxide tank used to pressurize a dispensing system for one or more beverages, such as one or more brands of draft beer, or one or more brands of soft drinks.

In taverns, fast-food restaurants and the like, containers of pressurizing gas, such as carbon dioxide, are relied upon to effect the dispensing of one or more beverages. The gas container is a heavy cylinder which should not be exposed to the beverage-consuming public, and it may in some cases be stored in a basement or back room at room temperature, or in other cases it may be stored in refrigerated space as where beer barrels are stored. Generally speaking, a freshly delivered and fully charged container will deliver gas at about 900 psi, but as the gas is consumed, the delivered pressure reduces. At a fast-food restaurant, a tank at room temperature will still have a day's useful supply of gas when the tank-delivery pressure has dropped to 500 psi, and a tank at refrigerator-storage temperature (e.g., 38° F.) will still have a day's useful supply of gas when the tank-delivery pressure reaches 400 psi. These are illustrative circumstances when the container-gas servicing company should be instructed to deliver a new container, or when a new container should be noted for connection before start of the next day's restaurant activity. Of course, an indicating pressure gage on each container will provide all necessary information, but with the kind of careless and inattentive help available today, the owner or manager stands either to run out of dispensing pressure at a time of great customer demand, or a tank could be changed prematurely, both events being to the economic disadvantage of the restaurant.

BRIEF STATEMENT OF THE INVENTION

It is an object of the invention to provide a simple and effective means of automatically remotely indicating that a change-over need is about to develop in a beverage-dispensing situation of the character indicated, i.e., without need to rely upon employee assistance for the indication.

It is a specific object to meet the above object with a simple remote indicator or alarm device, which will alert a management person, as at a cashier location in a restaurant.

Another specific object is to meet the above objects with a pressure-sensitive electrical transducer having the capability of being selectively switched to provide its remote warning of achieving a selected one of two pressures, the selection being as between the pressure applicable for a room-temperature container environment on the one hand, and a cold-storage environment on the other hand.

A further specific object is to meet the foregoing object with a transducer having further means for responding electrically to a predetermined still-lower pressure level in a gas container, as an indication that a bottom limit of reliable pressure delivery has been reached.

The invention achieves the foregoing objects with a pressure transducer in the form of a conventional Bourdon-type gage having provision for rotary displacement of an indicating needle which carries a permanent magnet at or near its tip end. Visual indications of pressure at or near a gas container are read via the needle against an arcuate scale for a range of pressures. The scale is inscribed on a face or dial of magnetically transparent material, and at least two sealed magnetic-reed switches are mounted at spaced angular locations beneath the scale, for independent change of their respective states upon sensed-pressure descent to first and second predetermined levels of pressure, respectively indicative of different impending needs to switch a new container into the line of pressure delivery to beverage-dispensing apparatus. In one form, the impending needs reflect corresponding situations of remaining gas content of the cylinder, for room temperature storage and for cold-room storage, respectively; and a manual switch at the gage enables the gage to perform, as is appropriate for the particular situation of stored-container temperature. In another form, the second or additional magnetic-reed switch is positioned beneath the scale for operation upon a sensed low level of gas-pressure effectiveness for beverage dispensing. In all cases, wiring connections to the switches of the gage operate indicator-lamp/alarm functions at a remote monitoring-unit location, whereby management personnel may take responsible action.

DETAILED DESCRIPTION

Figure 1:
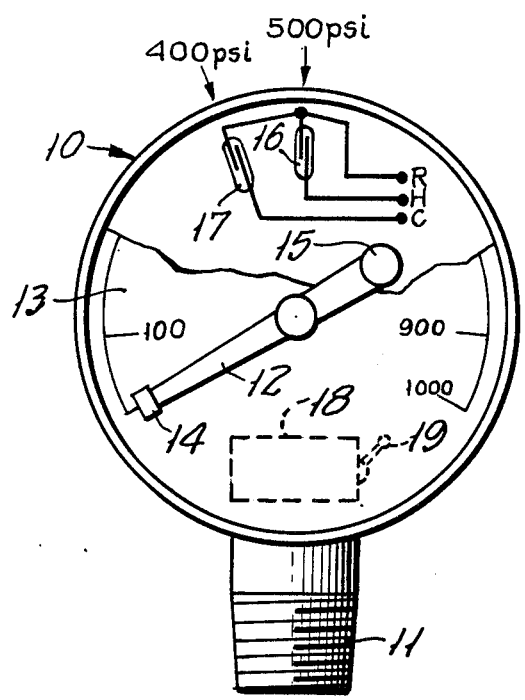
Figure 3:
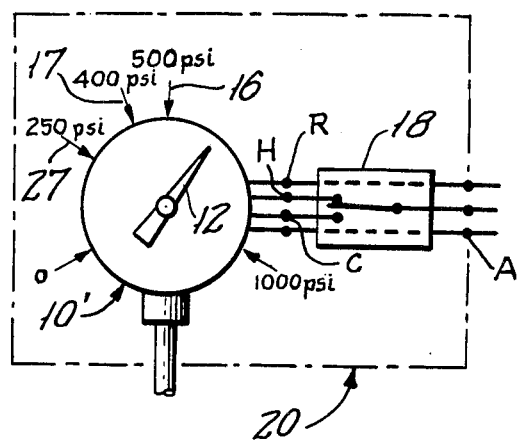
Figure 2:
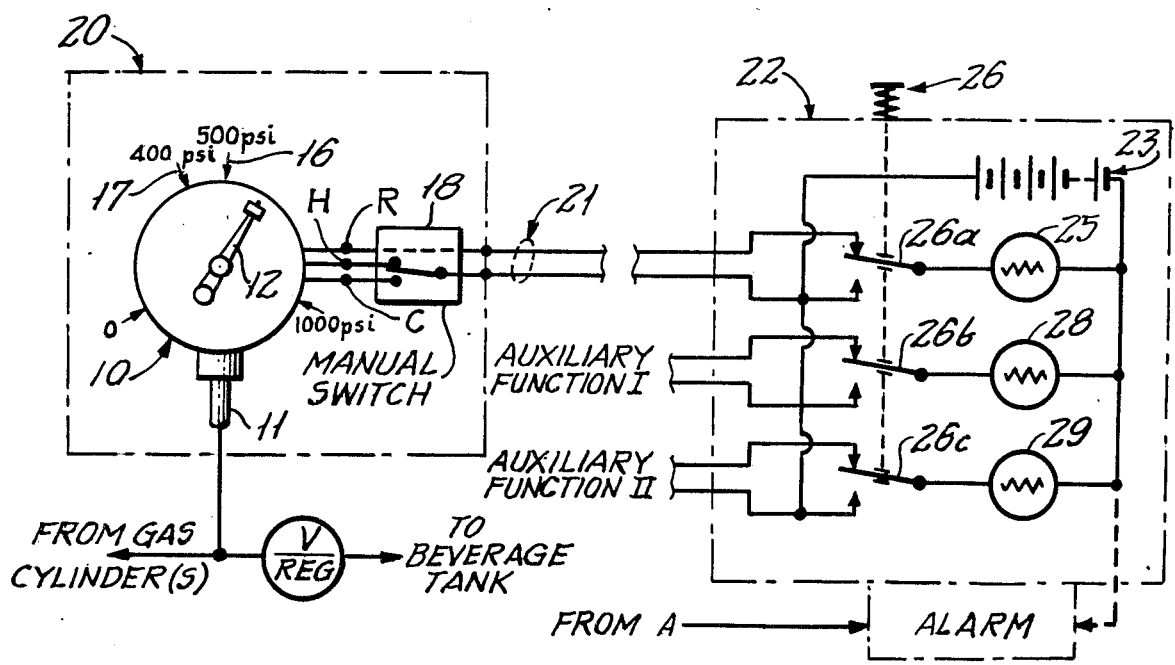

The invention will be illustratively described in conjunction with the accompanying drawings, in which FIG. 1 is a front view of a pressure gage, with its indicator face partly broken-away to reveal transducer means of the invention;

FIG. 2 is an electrical block diagram to schematically illustrate installed use of the invention; and FIG. 3 is a schematic diagram of a modified gage and transducer.

The gage 10 of FIG. 1 will be understood illustratively to be of the Bourdon type wherein gas pressure communicated via an inlet 11 is operative to position a rotary indicator needle 12 over an arcuate scale of pressures on a face or dial 13, the presently indicated range of pressures ranging from zero to 1000 psi; however for commercial gases (e.g. $CO_2$ or $N_2$ supplied at 3000 psi, it will be understood that the gage 10 will be of 0 to 3000 psi range. At or near its tip end, the needle 12 carries a permanent-magnet element 14 which sweeps in close clearance relation with dial 13, in response to inlet pressures within the range of gage capacity; a balancing mass or counterweight element 15 of non-magnetic material is shown on the tail end of needle 12. The dial 13 is a sheet or plate of magnetically-transparent material, and separate sealed magnetic-reed switches 16–17 are fixedly mounted to a base, as of circuit-board material, beneath the dial 13. A return terminal R is shown connected for return-line purposes to the outer poles of both switches 16–17, and separate further terminals, labeled H and C, provide independent other-pole connection to the respective switches 16–17. External legends in FIG. 1 identify the respective pressures at which switches 16–17 become operative, as by closure from normally open condition, upon a descending-pressure approach of the needle magnet 14 into magnetic operation upon each particular one of the switches 16–17. A further switch 18 with manual actuating means 19 is shown to be further contained within the gage casing and behind dial 13.

In FIG. 2, the switch 18 is positioned to show its electrical interposition between the H and C magnetic-reed switch connections and a means of electrical connection remote from the housing 20 of gage 10. As shown, the remote connection is via a two-conductor cable 21 to a monitoring station 22 contained with a single housing which, illustratively, may be located convenient to the cashier, bartender or other responsible restaurant person. One of the two conductors of cable 21 is shown connected to the contact arm of switch 18, which in FIG. 2 happens to have been positioned for connection to the H terminal of magnetic-reed switch 16, and the other conductor of cable 21 is directly tied to terminal R for return-circuit completion.

Power for electrical operation may be derived from house supply, via suitable transformer means and/or rectifier means, but in the form shown a battery 23 makes the system self-contained and it will be understood that battery 23 may be of the rechargeable variety with house-supply operated means (not shown) for maintenance of its charged condition. An indicator lamp 25 (which will be understood to additionally be schematically indicative of an audible-alarm device) is the means of displaying the safe-operating vs. warning condition of the gas cylinder to which gage 10 responds, and lamp 25 is shown connected for excitation when container gas drops to the 500 psi level (preselected by setting of switch 18). A push-button operable test switch 26 includes an arm 26a which, in its normal "up" position shown, and in the circumstance of a needle (12) actuated closure of magnetic-reed switch 16, establishes circuit completion for excitation of lamp 25; and lamp excitation continues as long as the needle magnet 14 is effective to maintain closure of magnetic-reed switch 18. A responsible restaurant person is thus alerted to the need for gas-cylinder change, as at the next overnight opportunity.

Upon connection of a freshly changed replacement gas cylinder, as suggested by legend in FIG. 2, a uniform level of beverage-dispensing gas pressure again becomes available, and any and all magnetic-reed switches are in their normally open condition, with needle magnet 14 up-scale therefrom and, therefore, with no excitation of lamp 25. To enable periodic test of lamp-circuit operability, the push button of test switch 26 is depressed to momentarily apply battery voltage directly across lamp 25.

FIG. 3 shows a modification of the described arrangement of FIGS. 1 and 2, in that the pressure gage 10' of FIG. 3 includes a still further magnetic-reed switch, symbolized at 27, and positioned beneath the gage dial for response to the field of magnet 14 when needle 12 indicates a drop in pressure to a predetermined bottom limit of operating pressure (e.g., 250 psi) for supply to the beverage-dispensing equipment. In FIG. 3, this additional magnetic-reed switch has external circuit connection, via a terminal A which is independent of selector switch 18. A third conductor is provided for remote monitor connection, the third conductor (A-connected) being shown in FIG. 2 to operate an alarm device, such as a buzzer, when the lower-limit condition has occurred.

It will be seen that the described gage transducer and circuitry meet all stated objects. The procuring and replacement of gas cylinders may be entrusted only to responsible restaurant personnel, and economy of the beverage-dispensing aspect of a restaurant business can be materially upgraded.

While the invention has been shown and described for preferred embodiments, it will be understood that modifications may be made without departing from the scope of the invention. Thus, for example, the monitoring unit 22 may include further lamps 28-29 connected as described for lamp 25, via separate further arms 26b-26c of the test switch 26, to independently serve for remote monitoring of other functions, i.e., other than supply gas pressure. The further functions are merely indicated by legend as auxiliary functions I and II, which may or may not be related to the remote reporting of operations pertaining directly to maintenance of beverage-dispensing equipment.

What is claimed is:

1. As an article of manufacture, a fluid-presure-responsive gage having a housing with a circular indicator face of magnetically transparent material, an indicator needle centrally mounted for sweeping rotary motion over an arcuate range of pressure indications on said face, a permanent-magnet element carried by said needle for sweeping movement with said needle, first and second magnetic-reed switch units fixedly mounted within said housing behind said face and positioned for independent magnetic-coaction with said needle magnet at each of two discrete levels of pressure indication within said range, and means accessible externally of said housing for external circuit connection of said switch units, one of said switch units being positioned to change its state for a predetermined lower limit of safe fluid pressure for the condition that a connected source of fluid pressure is in a refrigerated environment and the other of said switch units being positioned to change its state for a predetermined lower limit of safe fluid pressure for the condition that the connected source of fluid pressure is in a room-temperature environment.

2. The article of claim 1, in which said last-defined means includes a manually operable selector switch at said housing for selecting which one to the exclusion of the other of said magnetic-reed switch units is to be relied upon for said external circuit connection.

3. The article of claim 1, in which said last-defined means provides independent external circuit-connection access to both said switch units.

4. The article of claim 1, in combination with a remote monitor comprising a housing including an indicator lamp, and means including electrical connections between said indicator lamp and the externally accessible means of said gage for energizing said lamp in accordance with the instantaneous open/closed condition of at least one of said magnetic-reed switch units.

5. The combination of claim 4, in which said energizing means includes a storage battery in said monitor housing.

6. The combination of claim 5, in which said monitor unit includes a push-button operated test switch connected for a transient shunting of said electrical connections whereby to test the operability of said lamp.

7. The combination of claim 5, in which said monitor unit includes an electrically operated alarm device connected for operation by a change of state of that one of said switch units which is positioned for operational response to the lower one of said pressure levels.

8. The article of claim 1, in which said switch units are positioned to change their respective states at approximately 400 psi and at approximately 500 psi.

9. The article of claim 1, in which said switch units are positioned to change their respective states at aproximately 250 psi and at approximately 500 psi.

10. The article of claim 1, in which said switch units are positioned to change their respective states at approximately 250 psi and at approximately 400 psi.

* * * * *